United States Patent
Birdsell et al.

(10) Patent No.: US 6,585,486 B2
(45) Date of Patent: Jul. 1, 2003

(54) ELECTRICAL APPLIANCE ENCLOSURE WITH REMOVABLE SIDE WALL

(75) Inventors: Walter G. Birdsell, Marlborough, MA (US); Joseph S. Falvo, Johnston, RI (US); John V. Gregory, Southborough, MA (US)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 09/904,219

(22) Filed: Jul. 12, 2001

(65) Prior Publication Data

US 2003/0012641 A1 Jan. 16, 2003

(51) Int. Cl.$^7$ .............................................. F04D 29/60
(52) U.S. Cl. .................. 415/213.1; 415/214.1
(58) Field of Search .............................. 415/116, 213.1, 415/214.1; 416/5; 403/13, 14, 326, 327, 282, 281

(56) References Cited

U.S. PATENT DOCUMENTS

| | | |
|---|---|---|
| 948,438 A | 2/1910 | Ziegler et al. |
| 1,066,215 A | 7/1913 | Murray |
| 1,800,484 A | 4/1931 | Thomas, Jr. |
| 1,966,451 A | 7/1934 | Manquais |
| 3,483,309 A | 12/1969 | Kerseg et al. |
| 3,622,029 A | 11/1971 | Ware |
| 4,073,597 A | 2/1978 | Barnhart et al. |
| 4,133,300 A | 1/1979 | Burton, Jr. et al. |
| 4,263,472 A | 4/1981 | Maheu |
| 4,336,749 A | 6/1982 | Barnhart et al. |
| 4,428,492 A | 1/1984 | Jorgensen |
| 4,445,426 A | 5/1984 | Bohanon, Sr. |
| 4,612,412 A | 9/1986 | Johnston |
| 4,823,971 A | 4/1989 | Her |
| 4,834,615 A | 5/1989 | Mauch et al. |
| 4,867,640 A | 9/1989 | Penlesky et al. |
| 5,378,854 A | 1/1995 | Hoover |
| 5,407,088 A | 4/1995 | Jorgensen et al. |
| 5,574,255 A | 11/1996 | Simmons |
| 5,676,592 A | 10/1997 | Borgatti |
| 5,747,734 A | 5/1998 | Kozlowski et al. |
| 5,874,692 A | 2/1999 | Simmons |
| 5,879,232 A | 3/1999 | Luter, II et al. |
| 6,057,509 A | 5/2000 | Simmons |
| 6,077,037 A | 6/2000 | Schmidt |
| 6,145,750 A | 11/2000 | Carpenter |
| 6,159,093 A | 12/2000 | Mihalko, III |
| 6,160,956 A | 12/2000 | Pelonis |
| 6,164,475 A | 12/2000 | Jorgensen |

FOREIGN PATENT DOCUMENTS

| | | |
|---|---|---|
| AU | 268506 | 1/1965 |
| CA | 2048506 | 2/1995 |

Primary Examiner—Edward K. Look
Assistant Examiner—Kimya N McCoy (57) ABSTRACT

An electrical appliance housing is disclosed having a housing with an open side portion and an open front portion adjacent and perpendicular to the open side portion. A removable end panel is provided to fit within the open side portion of the housing and may include an elastically deformable detent mechanism on the side edges of the end panel to temporarily lock it to the housing. An interchangeable modular component is provided within the housing for establishing the function of the electrical appliance housing. The electrical appliance housing function may include air conditioning, air moving, light emitting, infrared light emitting or any other function desirable in a ceiling or wall appliance. The modular components are interchangeable, such that the function of the electrical box may be changed at any time by interchanging the modular components within the housing to the desired set-up. The end panel is also interchangeable, such that end panels with the desired componentry and electrical capabilities may be interchanged with each other to adapt the electrical appliance housing to the desired function. Additionally, the modular components may include a snap-fit mechanism to removably secure the modular components within the housing.

55 Claims, 8 Drawing Sheets

ELECTRICAL APPLIANCE ENCLOSURE WITH REMOVABLE SIDE WALL

FIELD OF THE INVENTION

This invention relates to electrical appliance housings. More particularly, this invention relates to a modular housing with the ability to interchange various components provided within the housing.

BACKGROUND OF THE INVENTION

Electrical boxes are typically placed in walls, ceilings and other places and are intended to contain switches, fuse blocks, or other electrical appliances including fans, heaters and lights. Typically, electrical boxes have been made of sheet metal, although plastic has been used. Components of electrical wiring systems, including electrical boxes, usually must meet the specifications of various electrical codes. For example, the relationship between the space or volume within an electrical box and the number and type of electrical connections or wire to be housed within the box may be specified to minimize fire hazards. In new building construction, electrical boxes are customarily installed before they are wired and before wall or ceiling material is applied. The electrical boxes are mounted, usually in a fixed position using nails or other fasteners, directly to joists or studs in the walls or ceilings of the building. Thereafter, the electrical box is wired as desired, wall or ceiling material may be placed over or around the electrical box to form the wall or ceiling, and a grill or panel may be placed over the electrical box open front.

SUMMARY OF THE INVENTION

The inventor has appreciated that it is often desirable to change the components in an electrical box after it has been installed, such as adding additional wiring or new components including heating elements, fans or light fixtures. Most electrical boxes, however, do not allow for adjustment of componentry after installation. For example, it may be desirable to convert an existing electrical box into an exhaust fan, a heater, a light or a combination thereof. Adding additional wiring or components to the box often involves either replacing the existing electrical box with one that has the desired components, or expanding the current electrical box, by ganging on additional box modules such that the additional components may be added. Replacing the electrical box or adding on additional boxes generally requires that the hole in the wall be expanded to remove the old box and replace it with a new box, or to add-on an additional box to the current electrical box. This may increase the expense of changing the function of the electrical box as damage to additional wall or ceiling surfaces around the electrical box must be repaired.

According to the present invention, an electrical appliance is disclosed having certain improvements. In one illustrative embodiment of the invention, an electrical appliance includes a housing having an open side portion and an open front portion adjacent the open side portion. A removable end panel is provided within the open side portion that substantially closes the open side portion. An interchangeable modular component is provided within the housing, such that the electrical appliance is adapted to perform a function, the function of the electrical appliance including at least one of air conditioning, air moving, light emitting and infrared light emitting.

In one aspect of the invention, the modular component may include at least one light fixture such as a fixture for an incandescent or heat lamp.

In another aspect of the invention, the modular component may include a fan assembly, and the fan assembly may include a motor mount assembly. The motor mount assembly may have a plate with an opening, a fan scroll extending from a first surface of the plate, and a motor mount provided on a second surface of the plate near the opening. The fan assembly may further include a motor mounted on the motor mount adjacent the opening, and a fan element attached to the motor adjacent the opening. The end panel of the electrical appliance may include an exhaust outlet provided adjacent the fan.

In another aspect of the invention, a heating element may be provided within the housing, wherein the heating element is adapted to heat air.

In another illustrative embodiment, the modular component of the invention, may include at least one snap-fit mechanism to removably lock the modular component within the housing. The housing may have a hole, and a portion of the snap-fit mechanism may fit within the hole. The snap-fit mechanism may include an elastically deformable generally U-shaped element, with one side having an extending member. The extending member may fit within the hole in the housing to removably lock the modular component into the housing. The extending member may be generally U-shaped. The hole in the housing may include a tab adapted to fit within an opening of the U-shaped extending member. The tab may locate the U-shaped extending member within the hole in the housing to removably lock the snap-fit mechanism to the housing.

The motor mount assembly, discussed above, may include at least one snap-fit mechanism. At least two snap-fit mechanisms may be provided on the motor mount assembly to removably lock the motor mount assembly within the housing, and the at least two snap-fit mechanisms may be provided on one side of the motor mount assembly. In another aspect of the invention, the motor mount assembly may include at least one member extending from the assembly opposite the snap-fit mechanism. The member may be adapted to fit within a corresponding feature provided in the end panel, such that the motor mount assembly is removably secured within the housing by the snap-fit mechanism and the member.

In another aspect of the invention, at least one of the housing, end panel, or modular component of the electrical appliance may include a biocide.

In another illustrative embodiment, the housing includes at least one channel provided along at least a portion of the open side portion of the housing, such that the end panel fits within the channel. The end panel may be flat. An elongated slot may be provided in the channel along a wall, and a detent mechanism may extend from a side of the end panel and be elastically deformable. The detent mechanism may be adapted to engage with the slot and removably lock the end panel within the housing. Additionally, a slot may be provided in each channel of the two opposite side walls, and a corresponding detent mechanism may be provided extending from opposite sides of the end panel, wherein the detent mechanisms extend into the slots for removably locking the end panel in the housing.

In one aspect of the invention, a wiring assembly may be provided on the end panel adapted to cooperate with electrical components of at least the modular component to allow the electrical components to be electrically powered. For example, the end panel may include an electrical compartment adapted to mate with electrical components from the end panel and the modular components. The endwall may include a plug adapted to electrically connect with a connector on the modular component.

In another aspect of the invention, the end panel may include an exhaust outlet, and the exhaust outlet may include a fan. The end panel may fit within the housing such that the end panel may be replaced without expanding beyond the housing by moving the endwall perpendicular to a back wall of the housing.

In another aspect of the invention, the housing may include mounting poles for locating different modular components within the housing. The mounting poles may be provided adjacent an inside surface of housing walls. The modular component may be secured to the mounting poles by a fastener inserted through a top of the mounting poles.

In another illustrative embodiment, a snap-fit mechanism includes an elastically deformable member having two sides, and a U-shaped extension, extending from at least one side of the member, wherein the U-shaped extension is adapted to engage a hole to removably lock the snap-fit mechanism in place. The extending member may be adapted to fit within a hole of a housing to removably secure the snap-fit mechanism within the hole. The generally U-shaped extension may be adapted to fit a tab from the hole within the generally U-shaped extension to removably secure the snap-fit mechanism within the hole. The elastically deformable member may also be generally U-shaped. The generally U-shaped extension may be provided perpendicular to the side of the elastically deformable generally U-shaped member.

In another illustrative embodiment, an electrical appliance is disclosed including a housing having an open side portion and an open front portion adjacent the open side portion. A removable end panel is provided within the open side portion and to substantially close the open side portion. A modular component is provided within the housing to establish the function of the electrical appliance, and a wiring assembly is provided on the end panel, wherein the end panel is interchangeable such that the end panel including the wiring assembly is adapted to support electrical components of at least the modular component.

In one aspect of the invention, the wiring assembly may be adapted to cooperate with the electrical components of at least a heat lamp, a fan, a heater, light fixture, a motor or an infrared device. The wiring assembly may include a plug assembly adapted to electrically interconnect with wiring from the modular component. The wiring assembly may also include a junction box within which electrical connections for modular components are made.

In another illustrative embodiment, a method of constructing an electrical appliance is disclosed. The method includes steps of providing a housing, with an open side and an open front, adapted to receive a plurality of modular components, selecting at least one modular component adapted to perform at least one of air conditioning, air moving, light emitting and infrared light emitting, selecting an endwall adapted to cooperate with the at least one modular component so that the component operates as intended when installed in the housing and assembling the modular component in the housing and the endwall within the open side.

BRIEF DESCRIPTION OF THE DRAWINGS

Other features and advantages of the invention will become apparent from the following detailed description taken in conjunction with the accompanying drawings, in which.

DETAILED DESCRIPTION

The present invention relates to electrical appliance housings. More specifically, at least one aspect of the present invention relates to a modular electrical appliance housing having a housing, a removable end panel and interchangeable modular components for establishing the function of the electrical appliance housing. The electrical appliance housing function may include air conditioning, air moving, light emitting, infrared light emitting or any other function desired for an electrical appliance housing provided in a wall or ceiling. The function of air conditioning includes both the heating and/or cooling of air, and any other processing of air, such as filtering, cleaning or humidifying air. Because the modular components are interchangeable, the function of the electrical appliance housing may be changed. For example, a light emitting electrical appliance housing may be changed to an air moving electrical appliance housing or both a light emitting and an air moving electrical appliance housing. Thus, the modular components may include such items as fans, motors, light fixtures, heating elements, heat lamps and infrared devices. The end panel may include connections or otherwise support electrical power supply for the various electrical components of the different modular components. The end panel may also include air inlets and/or outlets, and various location and retention elements to assist in removably locating modular components within the housing. Either the end panel, modular component or both may be replaced to change or modify the function of the electrical appliance housing to the desired different function as described above.

Figure 1:
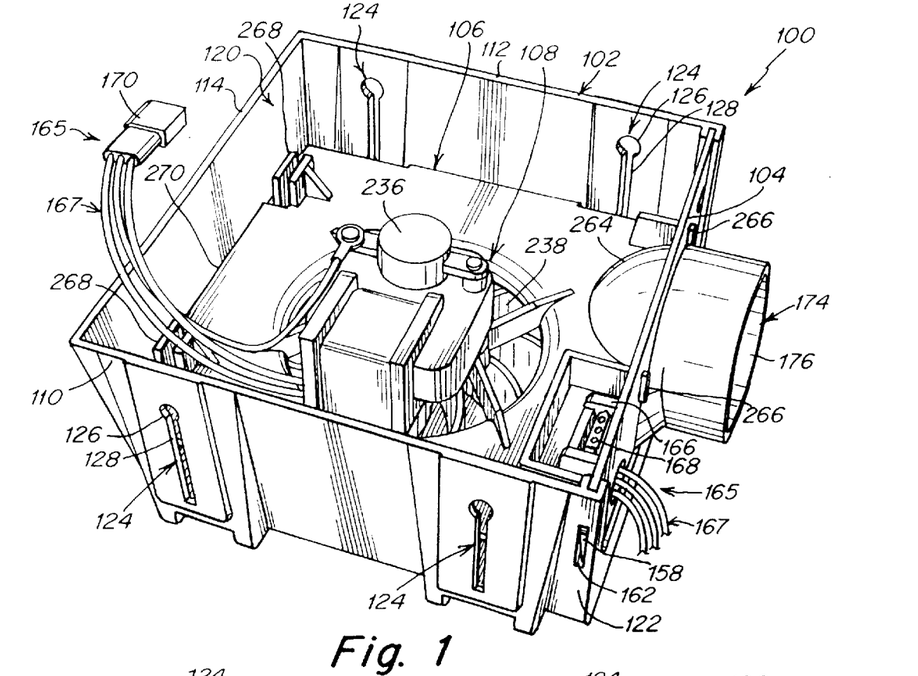
FIG. 1 is a perspective view of an electrical appliance housing according to an embodiment of the invention.
Figure 2:
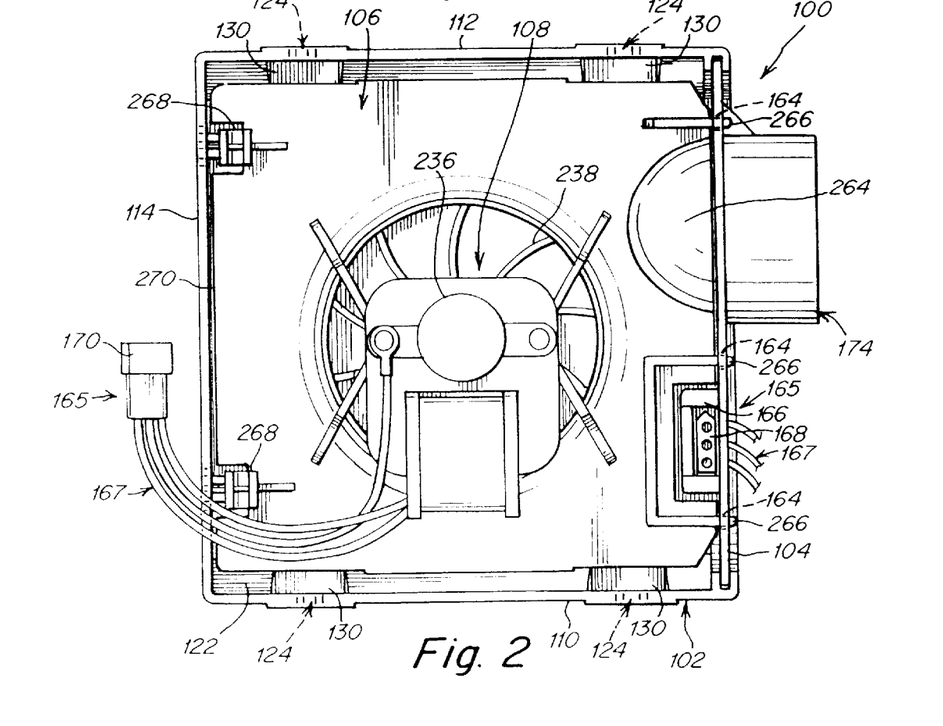
FIG. 2 is a top view of the electrical appliance housing of FIG. 1.

An electrical appliance housing 100, according to the illustrated embodiment as shown in FIGS. 1–2, has a housing 102 with a removably secured end panel 104, and at least one modular component 106 for establishing the function of the electrical appliance housing 100. As illustrated, the modular component 106 is a fan assembly 108 so that with the fan assembly 108, the electrical appliance housing 100 functions as an exhaust fan taking air in through a grill (not shown) over the open front 120 and expelling the air through an exhaust outlet 174.

Figure 3:
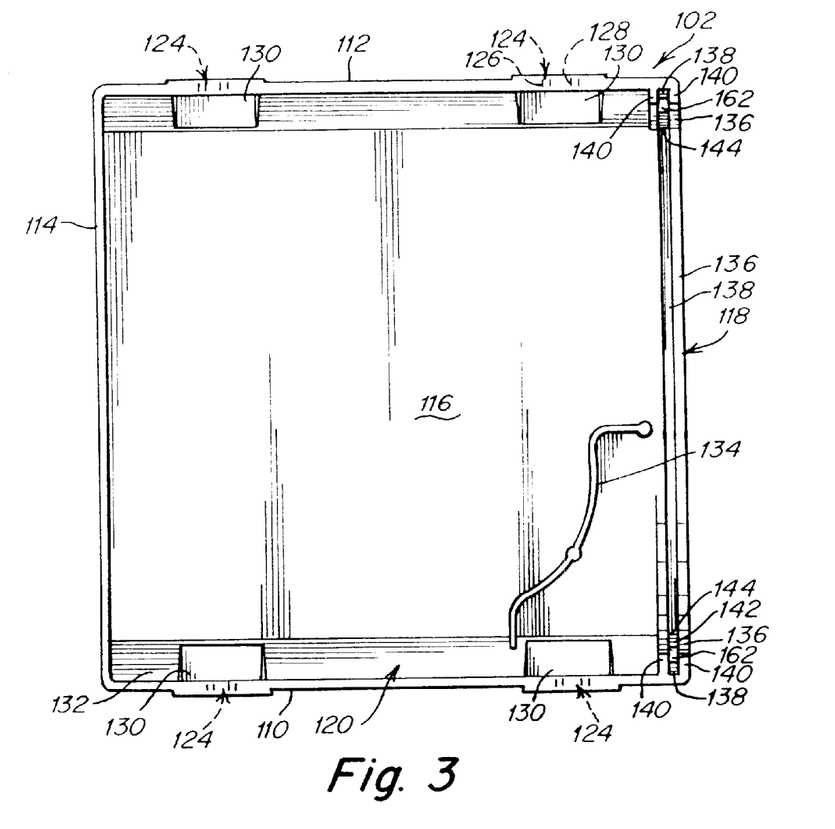
FIG. 3 is a top view of the housing of FIG. 1 with an end panel removed.

The housing 102, as shown in FIG. 3, may be shaped substantially as a box having a top wall 110, a bottom wall 112, a side wall 114, and a back wall 116. However, it will be understood that the housing may be any suitable shape, for example the housing could be cylindrical. As shown, the back wall 116 cooperates with the top, bottom and side walls 110, 112 and 114 to form a generally rectangular box with an open side 118 and an open front 120. At least a bottom portion 122 of the top, bottom and side walls 110, 112 and 114 may diverge outwardly from the back wall 116. The housing 102 is preferably made of plastic, such as a resilient, heat-resistant plastic. The housing 102 may be made by molding, for example by injection molding. The housing 102 may also be made of other suitable materials, such as sheet metal. A biocide material may be added to the material before forming any part of the electrical appliance housing, sprayed on after the part is completed or otherwise incorporated to resist growth of unwanted mold, mildew or other organisms.

As shown, the housing 102 may include key hole slots 124 for mounting the housing to a stud, joist or other part of a wall, ceiling or any other suitable location for the electrical appliance housing. A fastener (not shown), such as a screw or nail, may be inserted through the round hole 126 of the key hole slot 124, the electrical appliance housing 100 may then be moved to slide the fasteners into the elongated portions 128 of the key hole slots 124. The key hole slots 124 are provided on the top and bottom walls 110 and 112 of the housing 102, although they may be provided on any suitable wall of the housing 102. A depression 130 may be provided on an inner surface 132 of the walls around the key hole slots 124 to accommodate the fasteners. A grill or panel (not shown) may be provided over the open front 120 of the electrical appliance housing 100. The grill or panel may take on any desired configuration or shape. As is known, the grill may have openings to allow for air intake, particularly if the appliance has an air moving, or ventilation, function. A panel may be used when a light fixture is installed in the housing and allows light to shine though transparent or translucent portions or holes in the panel. The back wall 116 of the housing 102 may feature a curved wall 134 extending perpendicular to the back wall 116, or other feature to help locate modular components inside the housing 102.

The end panel 104 may be removably attached to the open side 118 of the housing 102 by any known manner. For example, the end panel 104 could be attached to the housing 102 using fasteners, screws, glue, adhesive, mating flanges or any other suitable arrangement or a combination thereof. As shown, the top, bottom and back walls 110, 112 and 116 each have a free edge 136 forming the boundary of the open side 118 opposite the side wall 114. Each free edge 136 may feature a channel 138. The channels 138 on the top and bottom walls 110 and 112 face each other and are connected by the channel 138 on the back wall 116, providing one continuous channel 138. The channels 138 may be any desired width and/or depth, and are preferably formed of two substantially parallel portions 140 as shown, although any suitable construction for the channels 138 may be used. Additionally, the channels 138 may feature a sloping section 142 on at least one of the corners 144 between the back wall 116 and the top or bottom wall 110 and 112. As shown, one continuous channel 138 may be provided, or two or more channels 138 may be provided along the free edges 136 of the top, bottom and back walls 110, 112 and 116. For example, a channel 138 may be provided along a section of the free edge 136 of each wall, two walls, or one wall. Further, multiple channeled sections may be provided on the free edge 136 of at least one wall.

Figure 4:
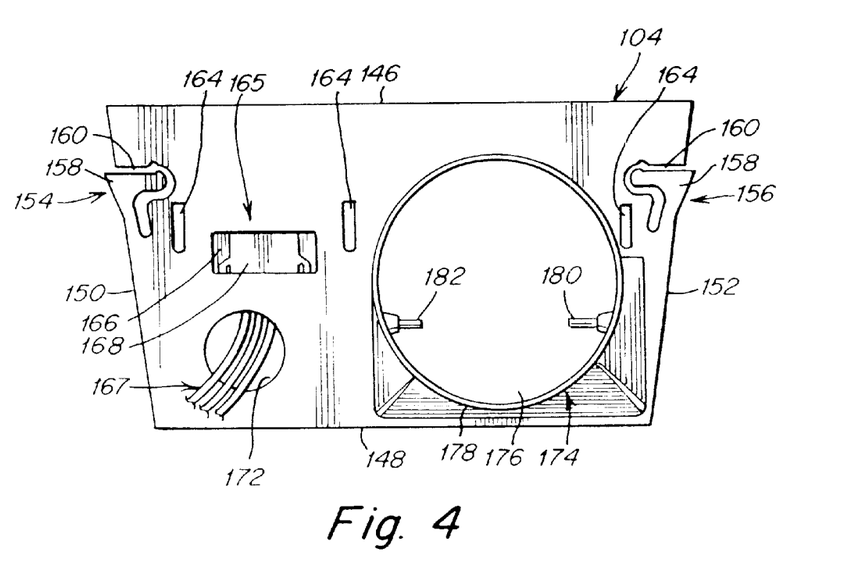
FIG. 4 is a front view of the end panel of the electrical appliance housing of FIG. 1.

As shown in FIGS. 1–2 and 4, the removable end panel 104 is inserted into the open side 118 within the channels 138 provided at the free edges 136 of the top, bottom and back walls 110, 112, and 116. The end panel 104 is inserted in a direction perpendicular to the back wall 116. Thus, a rectangular box is formed with the open front 120. Referring to FIG. 4, the end panel 104 is substantially flat and features a top edge 146, a bottom edge 148 and two side edges 150 and 152. As shown, the top edge 146 is longer than and parallel to the bottom edge 148. This causes the side edges 150 and 152 to diverge outwardly as they extend from the bottom edge 148 to the top edge 146. Thus, the side edges 150 and 152 are not parallel to each other, but may be in other embodiments. The end panel 104, however, may be made in any suitable shape so that the side edges 150 and 152 and bottom edge 148 mate with the corresponding channel 138 in the open side 118 of the housing 102. The end panel 104 may fit securely in the channels 138 with a friction or other interlocking fit, or the end panel 104 may fit loosely within the channels 138. In this embodiment, the end panel 104 is formed of plastic, but any suitable material may be used. Additionally, a biocide may be added to the material before forming the part, sprayed on after the part is completed or otherwise incorporated to resist growth of unwanted mold, mildew, or other organisms.

As shown, the end panel 104 may feature two locking mechanisms 154 and 156 provided on the side edges 150 and 152 of the end panel 104. The locking mechanisms 154 and 156 may be any locking mechanism suitable to removably secure the end panel 104 to the housing 102. Conceivably, different locking mechanisms could be used on the end panel 104. Preferably, the locking mechanism 154 and 156 is an elastically deformable detent mechanism 158 as shown in FIG. 4. The detent mechanism 158 is preferably formed as part of the end panel 104, although it could be a separate element. The detent mechanism 158 extends beyond the side edge 150 and 152 of the end panel 104. The detent mechanism 158 is provided with an opening 160 to allow the detent mechanism 158 to elastically deform. As shown, this opening 160 features a curved U-shape, although any suitable shape for the opening 160 may be used. The channels 138 on the free edges 136 of the top and bottom walls 110 and 112 of the housing feature slots 162 (see FIG. 1) that correspond with the detent mechanisms 158 on the end panel 104. Thus, when the end panel 104 is slid into the channels 138, the part of the detent mechanism 158 that extends beyond the side edge 150 and 152 of the end panel 104 inserts into the slot 162 to removably lock the end panel 104 within the open side 118 of the housing 102. To remove the end panel 104, the detent mechanisms 158 are moved to elastically deform the detent mechanism 158 by closing the opening 160 such that the detent mechanism 158 no longer extends beyond the side edge 150 and 152 into the slot 162 provided in the channel 138. The end panel 104 may then be removed from the open side 118 of the housing 102. Additionally, the end panel 104 may include slits 164, as shown in FIG. 4, to help position modular components in the housing and will be discussed in more detail below. As shown, three slits 164 are provided, however one or more slits 164 may be provided.

The end panel 104 may take on numerous different configurations, such that end panels 104 are interchangeable with each other on the housings 102 to provide a suitable configuration for the desired function of the electrical appliance housing 100. For example, the end panel may include wiring assemblies for supporting different electrical connections from various modular components. An air inlet and/or outlet may be provided in the end panel to assist with air conditioning or air moving. Also, various location and retention elements may be provided on the end panel for assisting in removably locating modular components within the housing. Thus, it will be understood that the configuration of the electrical housing 100 may be changed by simply changing the end panel 104. This may be done by removing the grill or panel on the open front 120 of the electrical appliance housing 100 or the portion of the wall or ceiling material over the open front 120 of the electrical appliance housing 100. The end panel 104 may then be removed as described above and a new end panel 104 inserted in its place.

As shown, the end panel 104 preferably is inserted within the walls of the housing 102. For example, the end panel 104 is inserted within the channels 138 provided in the housing 102, and is not attached on the outside of the housing 102 (although this is possible in some embodiments). This may reduce or eliminate the amount of wall or ceiling material that needs to be removed around the electrical appliance housing 100 when changing or upgrading the end panel 104 or other modular components 106 within the electrical appliance housing 100. Thus, cost and time for repairing the wall or ceiling around the electrical appliance housing 100 may be reduced. However, it will be understood that the end panel 104 may be removably attached to the housing by any suitable manner, including attaching the end panel to the outside of the housing. It will be understood that numerous other configurations in addition to those discussed below are envisioned for the end panel 104.

As shown in FIGS. 1, 2 and 4, the end panel 104 features a wiring assembly 165 and an exhaust outlet 174. This end panel 104 may be used with a variety of modular components 106. In particular, this end panel 104 may be used with modular components used to condition or move air. Depending on the modular components and/or functions to be supported by the end panel 104, the wiring assembly 165 may include such items as a junction boxes, wiring compartments, plugs and plug sets for wiring, wire sets and bonding screws among other suitable items. The wiring assembly 165 cooperates with electrical components 167 of the modular component 106 to allow the electrical components 167 to be electrically powered. An electrical compartment 166 may feature electrical connectors or plug sets 168 and 170 for the various electrical components 167 contained in the electrical appliance housing 100. The compartment 166 may be any suitable size for accommodating the electrical components 167 and plug sets 168 and 170. It will be understood that the electrical compartment 166 may accommodate different electrical plug sets 168 and 170 for different wiring arrangements, modular components 106 and wires with plugs 168. These may be plugged into the corresponding plug of 170 of the plug set 168 and 170, thus making wiring of modular components 106 more simple.

As shown in FIG. 4, a wire receiving opening 172 may be provided as an outlet for the electrical components 167 such as wiring from the electrical compartment 166. The wire receiving opening 172 as shown is circular; however, the wire receiving opening 172 may be any suitable shape. Additionally, the exhaust outlet 174 is provided within the end panel 104. The exhaust outlet 174 features an exhaust outlet opening 176 and an exhaust duct connector 178 extending outwardly from the end panel 104. As shown, the exhaust outlet 174 is circular, although any suitable shape, such as oval may be used. Two connector pins 180 and 182 may be provided in the exhaust outlet 174 for rotatably attaching an air director 184 (see FIGS. 5 and 7) within the exhaust outlet 174 to assist in preventing air from backing up and returning into the housing 102.

Figure 5:
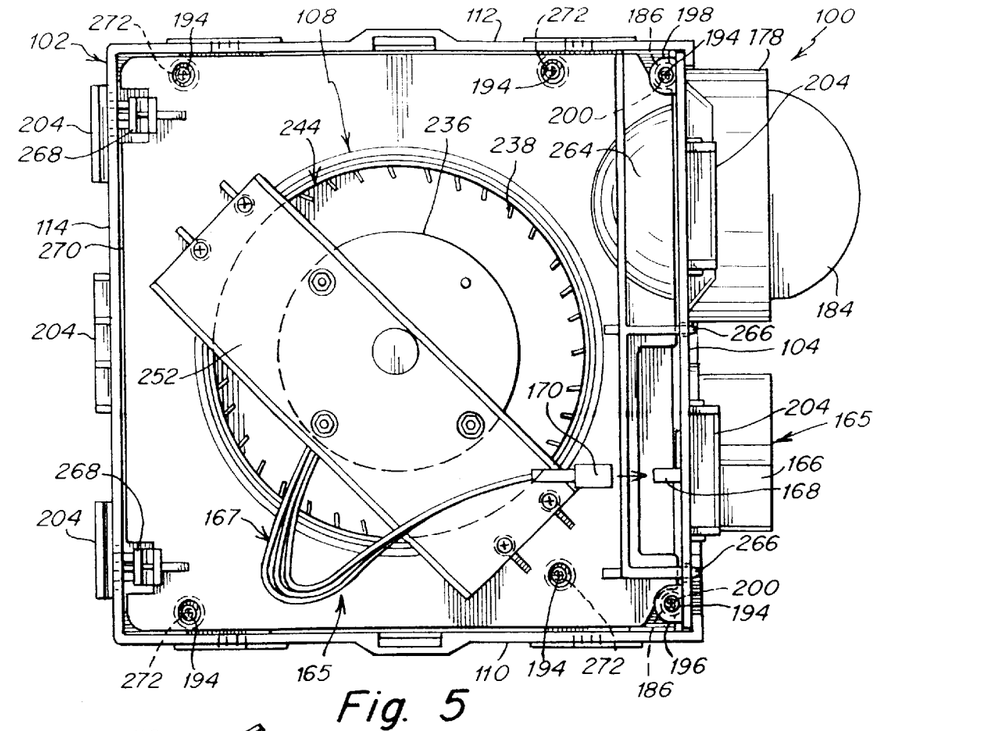
FIG. 5 is a perspective view of an electrical appliance housing according to another embodiment of the invention.
Figure 6:
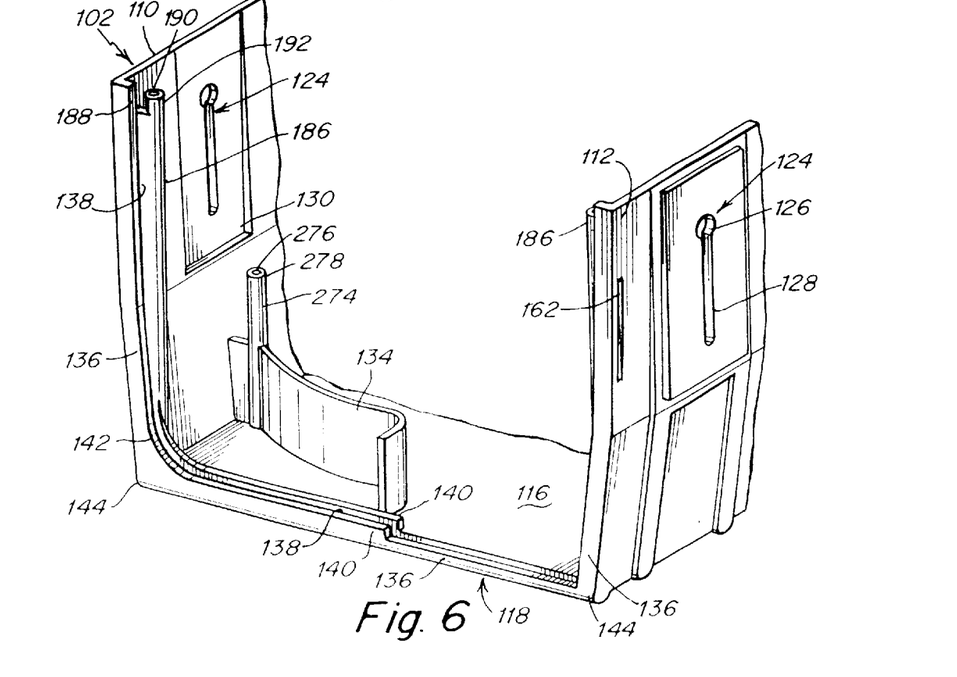
FIG. 6 is a detail view of the open side of the electrical appliance housing of FIG. 5.

Turning to FIG. 5, another embodiment of an electrical appliance housing 100 according to the invention is shown. The housing 102 is substantially similar to the housing 102 shown in FIGS. 1 and 2. As shown in FIG. 6, the housing 102 features mounting poles 186 adjacent the channels 138 located at the free edges 136 of the top and bottom walls 110 and 112. The mounting poles 186 are used to additionally secure the end panel 104 to the housing 102. Mounting poles may also be provided for securing different modular components within the housing 102 of different shapes, positions, heights and sizes. One portion 140 of the channel in this particular embodiment stops before the upper end 188 of the top and bottom walls 110 and 112, and the mounting pole 186 extends above the channel 138. The mounting pole 186 may be solid or hollow, but preferably features a hole 190 at the top 192 of the mounting pole 186 to accommodate a fastener 194, such as a screw. The mounting pole 186 is preferably formed integral with the housing 102, but may be made as a separate element.

Figure 7:
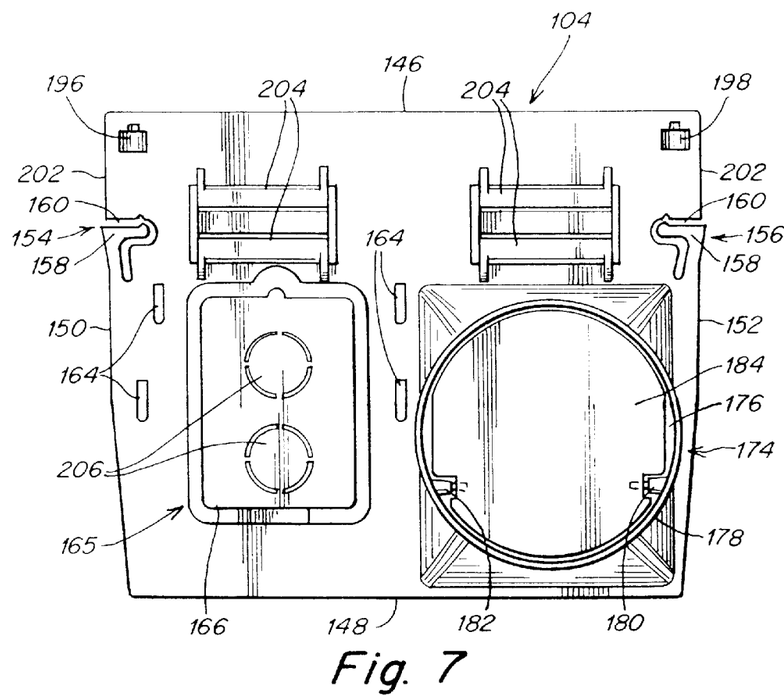
FIG. 7 is a front view of the end panel of the electrical appliance housing of FIG. 5.

FIG. 7 shows another embodiment of an end panel 104 according to the present invention. The end panel 104 is substantially similar to the end panel 104 shown in FIG. 4, and features a top edge 146, a bottom edge 148 and two side edges 150 and 152. As discussed above, the removable end panel 104 is inserted into the open side 118 of the housing 102 within the channels 138 provided at the free edges 136 of the top, bottom and back walls 110, 112 and 116. The end panel 104 is inserted in a direction perpendicular to the back wall 116. Thus, a rectangular box is formed with an open front 120. The end panel 104 may fit securely in the channel 138 with a friction fit, or the end panel 104 may fit loosely within the channel 138.

The side walls 150 and 152 may have, as shown, two locking mechanisms 154 and 156 provided on the side edges 150 and 152 of the end panel 104 as discussed above. The channels 138 on the free edges 136 of the top and bottom walls 110 and 112 of the housing 102 may include slots 162 that correspond with the locking mechanisms 154 and 156 on the end panel 104. When the end panel 104 is slid into the channels 138, the part of the locking mechanism 154 and 156 that extends beyond the side edge 150 and 152 inserts into the slot 162 to removably lock the end panel 104 within the open side 118 of the housing 102. Additionally, the end panel 104 features two extending caps 196 and 198 that each correspond to and fit over the top 192 of one mounting pole 186. When the end panel 104 is inserted into the open side 118, the caps 196 and 198 surround the tops 192 of the mounting poles 186. The caps 196 and 198 feature a top hole 200 corresponding to the hole 190 in the top 192 of the mounting pole 186. As shown in FIG. 5, a fastener 194, such as a screw, is inserted into the corresponding holes 200 and 190 of the cap 196 and 198 and mounting pole 186 to additionally secure the end panel 104 to the housing 102.

As shown, the upper portion 202 of the side walls 150 and 152 above the locking mechanism 154 and 156 may be parallel to each other. Additionally, the end panel 104 may include slits 164 similar to those mentioned above. As shown, four slits 164 are provided, however one or more slits 164 may be provided. Brackets 204 may also extend from the end panel 104 such that an aligned slot is formed in the end panel 104 parallel to the end panel 104.

As shown in FIG. 7, the end panel 104 features a wiring assembly 165, such as that discussed above. An electrical compartment 166 is provided similar to the end panel of FIG. 4 for locating various electrical components 167 contained in the electrical appliance housing 100. A larger end panel may be provided for a larger housing. The electrical compartment 166 is larger than the electrical compartment 166 shown on the end panel 104 of FIG. 4, but may be any suitable size for accommodating the electrical components 167 and plug sets 168 and 170. As shown in FIG. 7, two punch-out openings 206 may be provided on the electrical compartment 166 as an access for electrical components 167 such as wiring from the electrical compartment 166. The punch-out openings 206 as shown are circular; however, the punch-out openings 106 may be any suitable shape. Additionally, an exhaust outlet 174 is provided within the end panel 104. The exhaust outlet 174 features an exhaust outlet opening 176 and an exhaust duct connector 178 extending outwardly from the end panel 104. As shown, the exhaust outlet 174 is circular, although any suitable shape may be used. Two connector pins 180 and 182 may be provided in the exhaust outlet 174 for rotatably attaching the air director 184 (see FIGS. 5 and 7) within the exhaust outlet 174 to assist in preventing air from backing up and returning into the housing 102.

Figure 8:
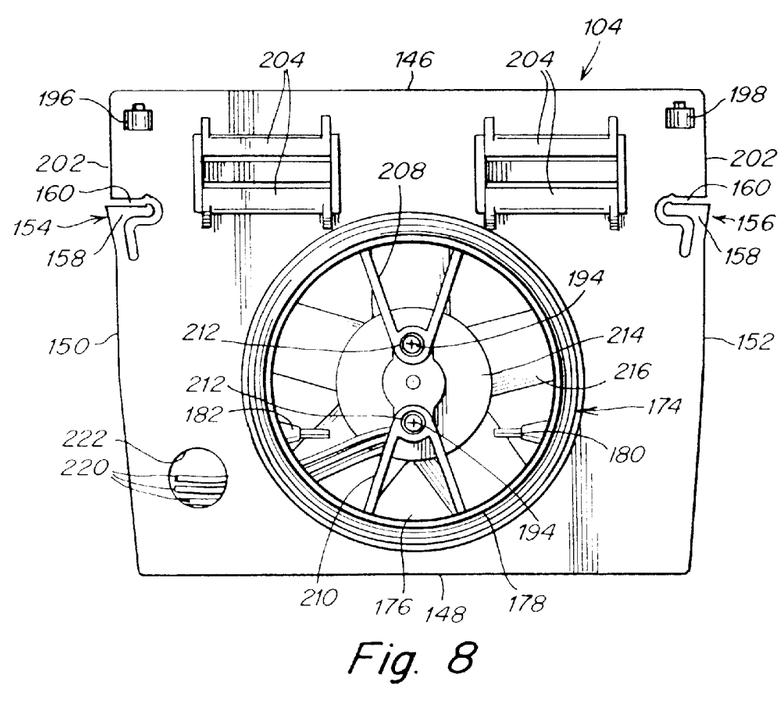
FIG. 8 is a front view of another embodiment of an end panel according to the invention.

Referring to FIG. 8, another embodiment for an end panel 104 according to the invention is shown. As discussed above, the removable end panel 104 is inserted into the open side 118 of the housing 102 within the channels 138 provided at the free edges 136 of the top, bottom and back walls 110, 112 and 116. The end panel 104 preferably features two locking mechanisms 154 and 156 provided on the side edges 150 and 152 of the end panel 104 and two extending caps 196 and 198, as discussed above.

The end panel 104 of FIG. 8 features an exhaust outlet 174. The exhaust outlet 174 is centrally located between the side edges 150 and 152 and features an exhaust outlet opening 176 and an exhaust duct connector 178 extending outwardly from the end panel 104. As shown, the exhaust outlet 174 is circular, although any suitable shape, may be used. The exhaust outlet features two mounts 208 and 210 having mounting holes 212 extending into the exhaust opening 176. A motor 214 is mounted on the mounts 208 and 210 using fasteners 194, such as screws. A fan 216 is rotatably attached to the motor 214, for example on a rotatable shaft (not shown) extending from the motor 214. Two connector pins 180 and 182 may be provided in the exhaust outlet 174 for attaching an air director 184 (see FIGS. 5 and 7) to assist in preventing air from backing up and returning into the housing 102. End panel 104 may include a wiring assembly 165 to cooperate with the electrical components of the modular component to allow the electrical components to be electrically powered. Wires 220 from the motor may be directed to the electrical compartment 166 and out of the housing 102 through a wire receiving opening 222 in the end panel 104. As shown, the wire receiving opening 222 is circular, but may be any suitable shape. The wires 220 may include a plug 168 to correspond with a plug 170 in the electrical compartment 166.

Figure 9:
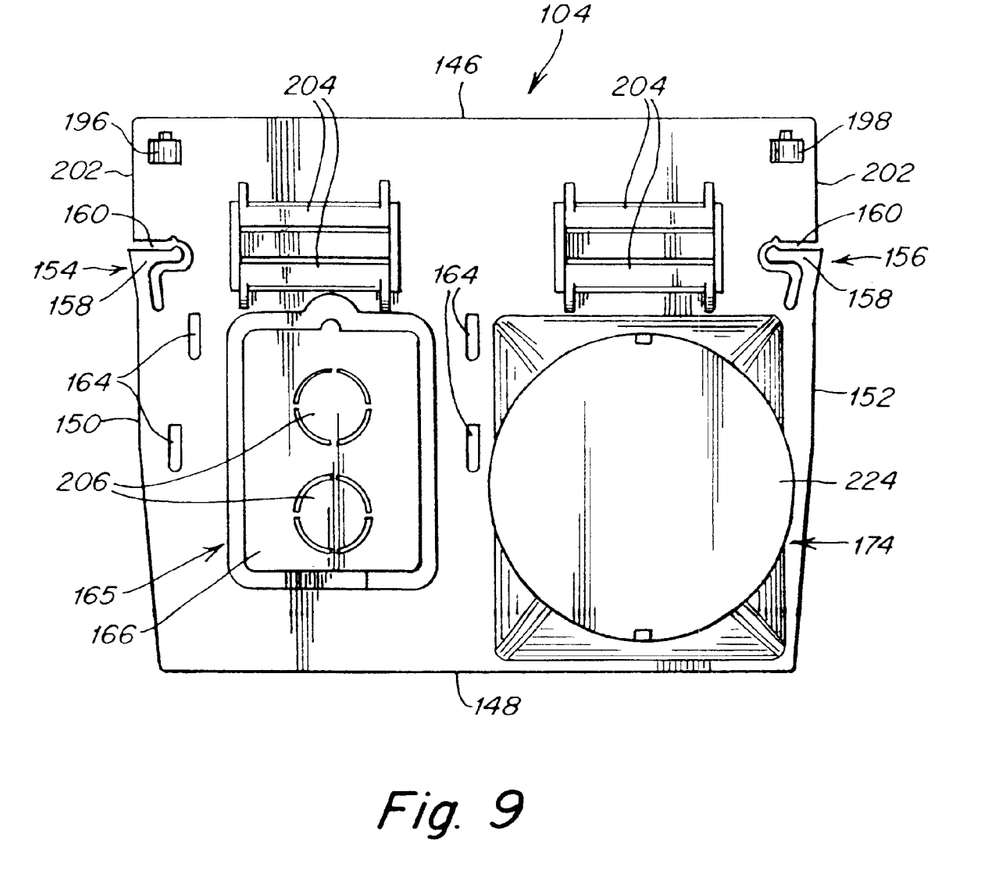
FIG. 9 is a front view of another embodiment of an end panel according to the invention.

Now referring to FIG. 9, another embodiment of an end panel 104 is shown. The end panel 104 is substantially the same as the end panel 104 of FIG. 7, except that the exhaust outlet 174 is closed with a cover 224. This end panel 104 may be used in an electrical appliance housing having a light fixture as the modular component, with no fan assembly 108.

Figure 10:
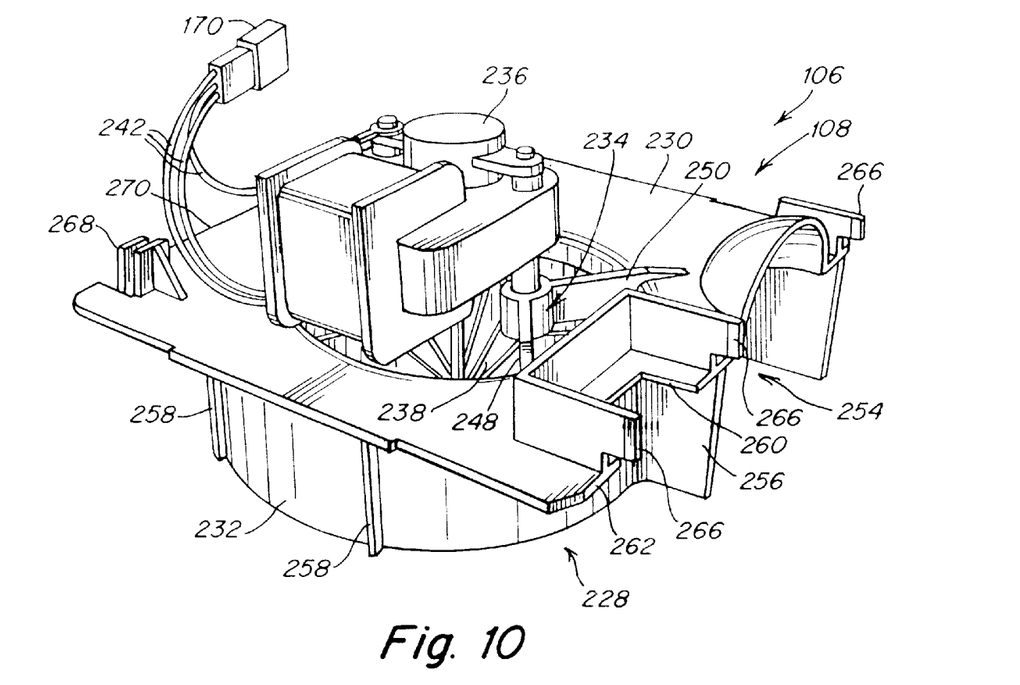
FIG. 10 is a perspective view of the fan assembly of the electrical appliance housing of FIG. 1.

FIG. 10 illustrates a modular component 106 that may be removably secured in a housing 102 to give the electrical appliance housing 100 a particular function. A fan assembly 108 according to the present invention is shown for use in the electrical box housing 102. The fan assembly 108 features a motor mount assembly 228 including a plate 230, a fan scroll 232 attached to the underside of the plate 230 and a motor mount 234 attached to the upper side the plate 230. A motor 236 is mounted on the motor mount 234, and a fan 238 is rotatably attached to the motor 236 by a rotatable shaft (not shown) extending from the motor 236. Any suitable motor and/or fan may be used. The electrical wires 242 from the motor 236 may be hooked up to the electrical compartment 166 in the end panel 104 using plug sets 168 and 170.

Figure 11:
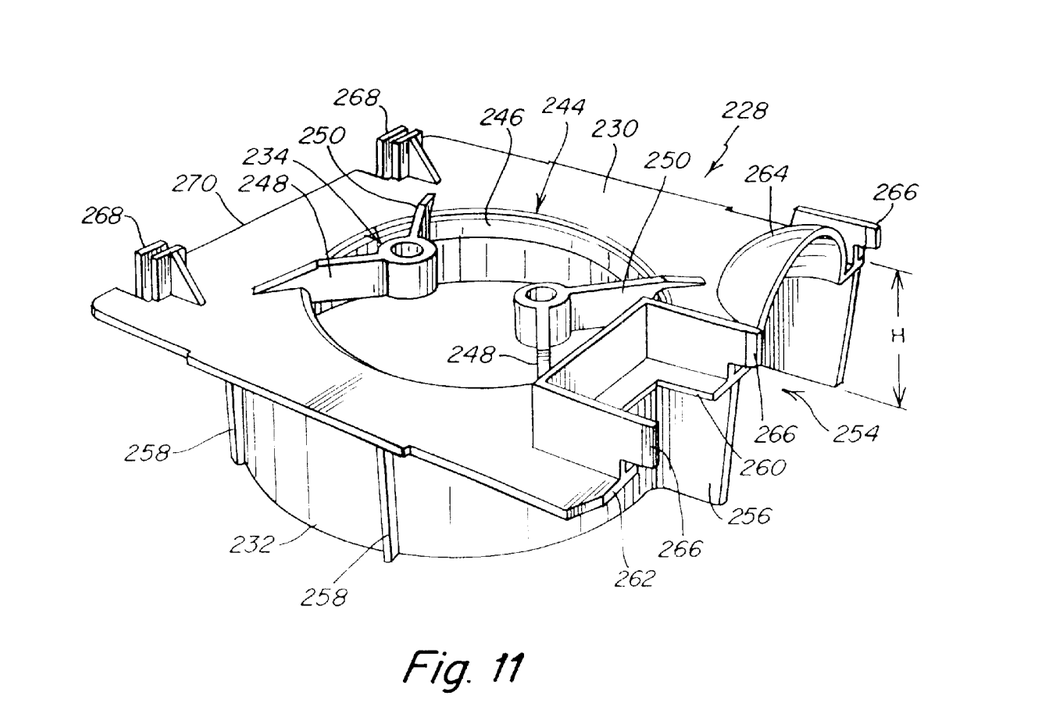
FIG. 11 is a perspective view of the motor mount/fan scroll assembly of the electrical appliance housing of FIG. 1.

As shown in FIG. 11, the motor mount assembly 228 includes the plate 230, the fan scroll 232 and the motor mount 234. The motor mount assembly 228 is a one-piece molded plastic assembly, although, the motor mount assembly 228 may be made of any suitable material and may have a separate construction. For example, the motor mount 234 may be a separate piece attached to the plate 230. Additionally, a biocide may be added to the material before forming the part, sprayed on the formed part or otherwise incorporated to resist growth of unwanted mold, mildew or other organisms. The flat plate 230 includes an opening 244. As shown, the opening 244 is centrally located and is circular with a downwardly extending lip 246. However, any suitable location and shape may be used for the opening 244. The motor mount 234 is located adjacent and over the opening 244 in the plate 230 and is provided for mounting a motor 236 thereto. The motor mount 234 features two struts 248 and 250 for attachment to the motor 236 using fasteners. However, as shown in FIG. 5, a single strut 252 over the opening 244 may be used to mount the motor 236.

The fan scroll 232 is provided attached to the plate 230 of the motor mount assembly 228, and is substantially circular to accommodate the fan 238. The fan scroll 232 includes an opening 254 with an extension 256 to mate with the exhaust outlet 174 formed in the end panel 104. The fan scroll 232 may feature ribs 258 for providing additional strength and stability to the fan scroll 232. The motor 236 is mounted on top of the motor mount 234, and the fan 238 is attached to the rotatable shaft (not shown) extending from the motor 236 beneath the motor mount 234 and within the fan scroll 232. The plate 130 of the motor mount assembly 228 is constructed to fit within the housing 102. The fan scroll may sit on the back wall 116 of the housing 102 and may abut against the baffle 134.

A cut-out 260 may be provided in the plate 230 along an edge 262 of the plate adjacent the end panel 104 to accommodate the electrical compartment 166. Additionally, a curved hood 264 may be provided for location above the exhaust outlet 174 in the end panel 104. The edge 262 of the plate 230 for location adjacent the end panel 104 may additionally feature members 266 that extend from the plate and may be inserted within the slits 164 of the end panel 104 described above. As shown the members 266 and slits 164 are vertically oriented, although any shape or orientation for the members 266 and the corresponding slits 164 may be used. Additionally, a snap-fit mechanism 268 may be provided on the motor mount assembly 228 for securing the motor mount assembly 228 within the housing 102. As shown, two snap-fit mechanisms 268 are provided on the edge 270 of the plate 230 opposite from the edge 262 adjacent the end panel 104. Preferably, these snap-fit mechanisms 268 work with the members 266 and slits 164 to removably secure the motor mount assembly 228 within the housing 102. The snap-fit mechanisms 268 will be discussed in more detail below.

Figure 12:
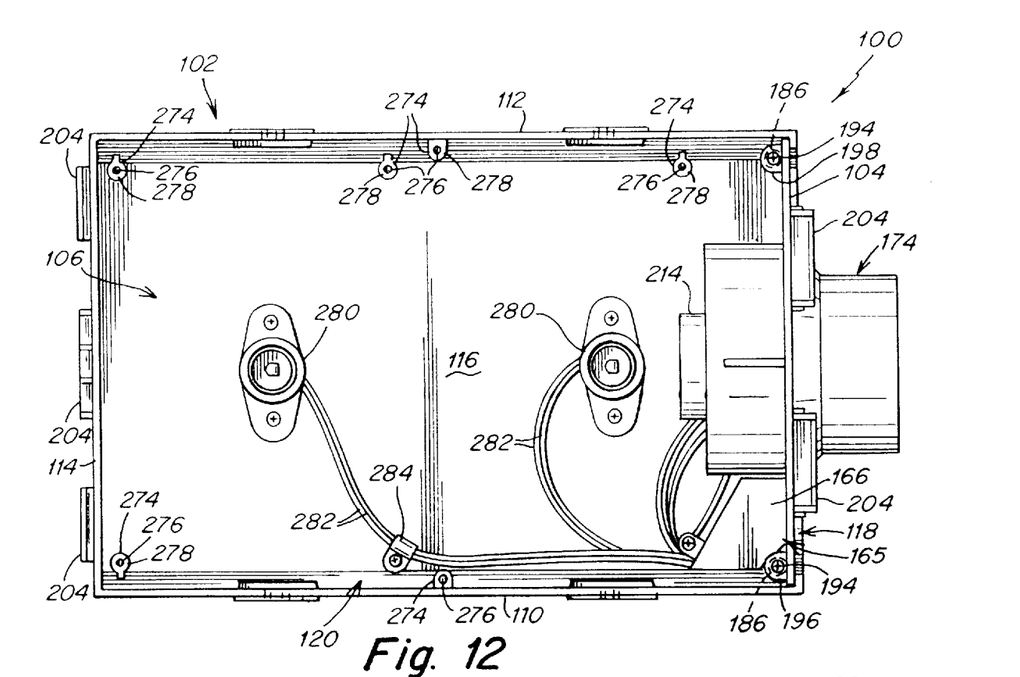
FIG. 12 is a top view of another embodiment of the electrical appliance housing according to the invention.
Figure 13:
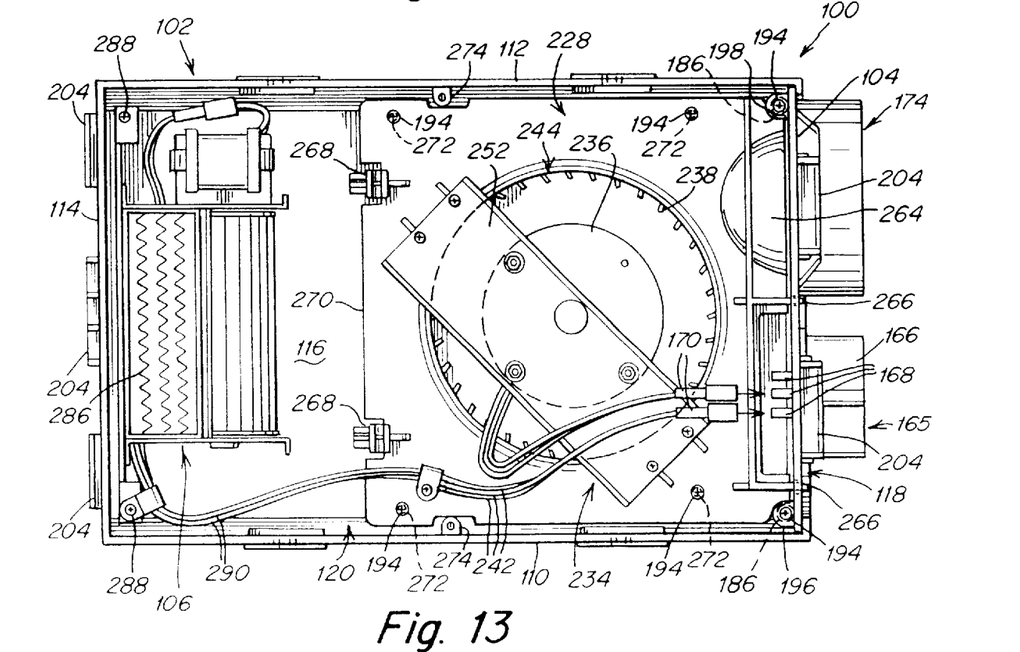
FIG. 13 is a top view of another embodiment of the electrical appliance housing according to the invention.

As shown in FIGS. 5 and 13, fastener receiving apertures 272 may be provided in the plate 230 of the motor mount assembly 228. These apertures 272 correspond with additional mounting poles 274 (see FIG. 12) provided in the housing 102 adjacent the top and bottom walls 110 and 112. These mounting poles assist in securing various sized and shaped modular components 106 within the housing. For example, the mounting poles 274 are provided at different heights to accommodate different sized motor mount assemblies 228 and other modular components 106. Fan scrolls 232 of different heights H may be attached to the plates 230 of the motor mount assemblies 228, thus locating the motor mount assemblies 228 at different heights within the housing 102. Holes 276 are provided in the top 278 of the mounting poles 274 and these correspond to the apertures 272 in the plate 230. Fasteners 194 may be used to additionally secure the motor mount assembly 228 to the housing 102 by attachment through the apertures 272 into the mounting poles 274.

Referring to FIG. 12, another embodiment of the electrical appliance housing 100 according to the invention is shown. The electrical appliance housing 100 features a housing 102 with an end panel 104 as described above. As shown, the end panel 104 is the embodiment described above with respect to FIG. 8. This electrical appliance housing 100 with the end panel 104 of FIG. 8, functions as an air mover (e.g., to cool the interior of the housing 100) and a light emitter. The housing 102 shown is larger than the housings 102 of FIGS. 1–3 and 5; however the construction is substantially similar. This electrical appliance housing 100 features another embodiment of the interchangeable modular component 106. Lighting fixtures 280 are provided within the housing 102 and removably attached to the back wall 116 of the housing 102. The light fixture 280 may be any suitable light fixture to accommodate a variety of light bulbs such as incandescent or infrared/heat lamps (not shown). Wires 282 from the light fixtures 280 are directed to the electrical compartment 166. The wires 282 may be secured to the housing 102 using any type of fastening device 284 as shown.

Now referring to FIG. 13, another embodiment of the electrical appliance housing 100 according to the invention is shown. The electrical appliance housing 100 features a housing 102 with an end panel 104 substantially the same to that discussed with regard to FIGS. 5–7. This electrical appliance housing 100 with the end panel of FIG. 7, functions as an air conditioner and air mover (e.g., ventilator). The electrical appliance housing 100 features a motor mount assembly 228 having a separate motor mount 234 attached to the plate 230 formed as a single strut 252. A motor 236 is attached to the motor mount 234 through the opening 244 in the plate and a fan 238 is attached to a rotatable shaft (not shown) extending from the motor 236. The wires from the motor may be attached to the electrical compartment 166 in the end panel 104. Additionally, the electrical appliance housing 100 features a heating element 286 secured to the housing using fasteners 288. The wires 290 from the heater may also be attached to the electrical compartment 166 in the end panel 104. Light fixtures 280 may also be accommodated within the housing for providing light. Thus, various modular components 106 may be accommodated within one electrical appliance housing 100. It will be understood that each modular component 106 may also be contained in one electrical appliance housing 100, and that the modular components may be exchanged with each other.

Figure 14:
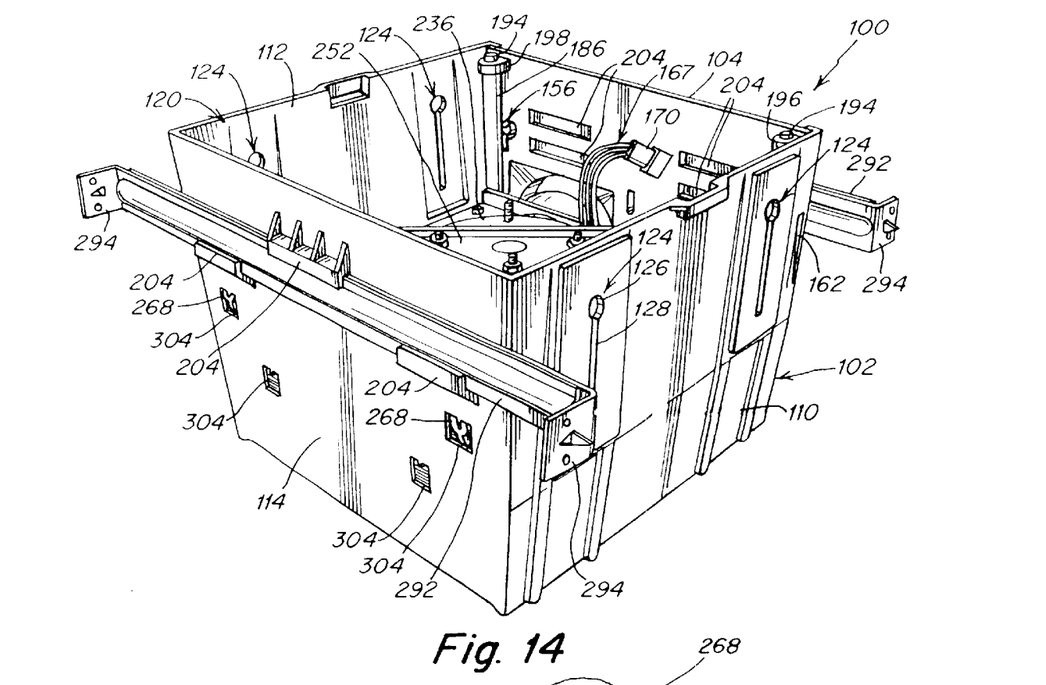
FIG. 14 is a back perspective view of an electrical appliance housing according to the invention including sliding locator bars.

As shown in FIG. 14 and is well known in the art, the end panel 104 and the side wall 114 of the electrical appliance housing 100 may feature sliding locator bars 292. Brackets 204 in the end panel 104 and side wall 114 of the housing 102 accommodate the locator bars 292. As shown, these locator bars 292 are provided on and parallel to the end panel 104 and side wall 114 and adjacent to the open front 120 of the housing 102. The locator bars 292 are slid through the brackets 204. As shown, two brackets 204 are formed in the side panel 114 facing the open front 120 of the housing 104 and one bracket 204 is formed between them facing the back wall 116 of the housing 102. The locator bar 292 is slid between these brackets 204 and is slidably secured therein. As shown in FIGS. 7–9, the end panel may include two pairs of brackets 204 facing each other to form the slots in which to slide the locator bars 292. As shown, two locator bars 292 may be accommodated in the brackets 204 simultaneously, such that they overlap each other. The locator bars 292 may be used to secure the electrical appliance housing 100 between two studs or beams in a wall or ceiling. The two locator bars 292 may be slid relative to one another to increase or decrease the distance between perpendicular ends 294 of the locator bars 292, such that the electrical appliance housing 100 may be positioned in a variety of different sized spaces. The electrical appliance housing 100 may also be slid along the locator bars 292 to adjust its position along the bars 292.

Figure 15A:
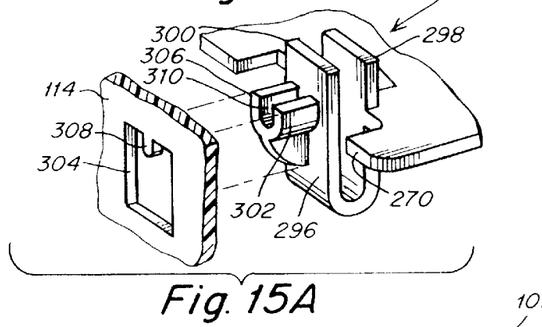
FIG. 15A is a perspective view of the snap-fit mechanism according to the invention.

FIG. 15A shows an embodiment of the snap-fit mechanism 268 according to the present invention. The snap-fit mechanism 268 includes a U-shaped element 296 that is elastically deformable by squeezing the two free ends 298 and 300 of the U-shaped element 296 together. Although any shaped element that is elastically deformable may be used. An extension piece 302 extends from one side of the U-shaped element 296. As illustrated in FIGS. 1, 2, 5 and 13, the snap-fit mechanism 268 is provided on the edge 270 of the plate 230 located opposite the end panel 104, although the snap-fit mechanism could be provided at any suitable location on any modular component 106. Preferably, the snap-fit mechanism 268 is integrally formed with the plate 230. The side wall 114 of the housing 102 features a snap-fit hole 304 corresponding to the extension piece 302, such that when the motor mount assembly 228 is fit within the housing 102 the extension piece 302 fits within the snap-fit hole 304 to removably lock the motor mount assembly 228 within the housing 102.

As shown, the U-shaped element 296 is provided perpendicular to the side wall 114 of the housing 102. The extension piece 302 is preferably a smaller U-shaped piece 306 and the corresponding snap-fit hole 304 in the side wall 114 features a tab 308 that fits within an opening 310 in the U-shape piece 306 to additionally lock the motor mount assembly 228 in the housing 102. The tab 308 aligns the U-shape piece 306 within the snap-fit hole 304, thus a precisely formed hole is not required. The U-shaped piece 306 and the tab 308 cooperate to removably lock the snap-fit mechanism 268 within the hole 304.

Figure 15B:
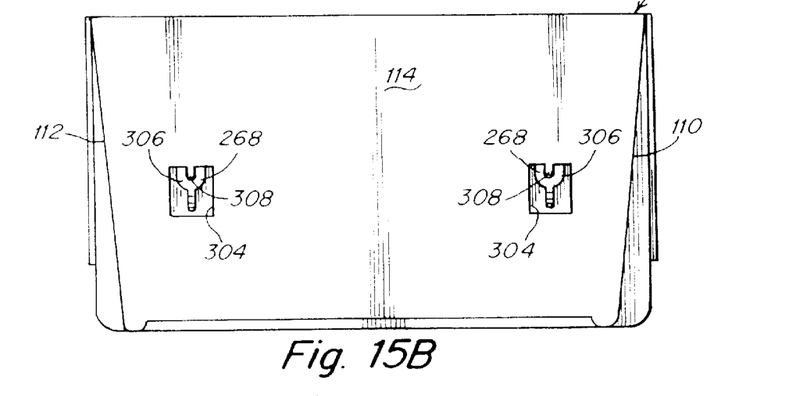
FIG. 15B is a back view of the assembled electrical appliance housing of FIG. 1 showing the snap-fit mechanism.

FIG. 15B shows the snap-fit mechanisms 268 within the snap-fit holes 304 of the side wall 114 of the housing 102. Multiple sets of snap-fit holes 304 may be provided at different heights within the housing 102 similar to the mounting poles 274 in the housing 102 as shown in FIG. 14. This will allow motor mount assemblies 228 of different heights H to be accommodated in the same housing 102, thus increasing interchangeability of the components within the housings 102. To remove the modular component 106 from the housing, the two free ends 298 and 300 of the U-shaped element 296 are squeezed together, thereby releasing the U-shaped piece 306 from the snap-fit hole 304 in the housing and allowing the modular component 106 to be removed from the housing 102.

Although the present invention is described with reference to certain preferred embodiments, it will be appreciated that numerous modifications and other embodiments may be devised by those skilled in the art. For example, the housing may be a nonrectangular shape, such as a circular, square or other suitable shape. Additionally, it will be understood that the housing 102 may include two or more open sides 118 that may each be fit with a removable end panel 104. Therefore, it will be understood that the appended claims are intended to cover all such modifications and embodiments which are within the spirit and scope of the present invention.

What is claimed is:

1. An electrical appliance, comprising:
   a housing having an open side portion and an open front portion adjacent the open side portion;
   a removable end panel provided within the open side portion that substantially closes the open side portion; and
   an interchangeable modular component provided within the housing, such that the electrical appliance is adapted to perform a function, the function of the electrical appliance including at least one of air conditioning, air moving, light emitting and infrared light emitting.

2. The electrical appliance according to claim 1, wherein the modular component includes at least one light fixture.

3. The electrical appliance according to claim 1, wherein the modular component includes a fan assembly.

4. The electrical appliance according to claim 3, wherein the fan assembly includes a motor mount assembly.

5. The electrical appliance according to claim 4, wherein the motor mount assembly includes:
   a plate having an opening;
   a fan scroll extending from a first surface of the plate; and
   a motor mount provided on a second surface of the plate near the opening.

6. The electrical appliance according to claim 5, wherein the fan assembly further includes:
   a motor mounted on the motor mount adjacent the opening; and
   a fan element attached to the motor adjacent the opening.

7. The electrical appliance according to claim 6, wherein the end panel includes an exhaust outlet provided adjacent the fan.

8. The electrical appliance according to claim 7, further comprising a heating element provided within the housing, wherein the heating element is adapted to heat air.

9. The electrical appliance of claim 4, wherein the motor mount assembly includes at least one snap-fit mechanism to removably lock the motor mount assembly within the housing.

10. The electrical appliance according to claim 9, wherein the housing has a hole, and a portion of the snap-fit mechanism fits within the hole.

11. The electrical appliance of claim 10, wherein the snap-fit mechanism includes an elastically deformable generally U-shaped element, with one side having an extending member.

12. The electrical appliance according to claim 11, wherein the extending member fits within the hole in the housing to removably lock the motor mount assembly into the housing.

13. The electrical appliance according to claim 12, wherein the extending member is generally U-shaped.

14. The electrical appliance of claim 13, wherein the hole in the housing includes a tab adapted to fit within an opening of the U-shaped extending member.

15. The electrical appliance according to claim 14, wherein the tab locates the U-shaped extending member within the hole in the housing to removably lock the snap-fit mechanism to the housing.

16. The electrical appliance of claim 9, wherein at least two snap-fit mechanisms are provided on the motor amount assembly to removably lock the motor mount assembly within the housing.

17. The electrical appliance of claim 16, wherein at least two snap-fit mechanisms are provided on one side of the motor mount assembly.

18. The electrical appliance of claim 9, further comprising: at least one member extending from the motor mount assembly opposite the snap-fit mechanism, wherein the member is adapted to fit within a corresponding feature provided in the end panel, such that the motor mount assembly is removably secured within the housing by the snap-fit mechanism and the member.

19. The electrical appliance according to claim 1, where at least one of the housing, end panel, or modular component include a biocide.

20. The electrical appliance according to claim 1, wherein the modular component includes a fan, and the end panel includes an exhaust outlet adjacent the fan.

21. The electrical appliance of claim 20, further comprising a motor, with the fan rotatably attached the motor.

22. The electrical appliance of claim 21, further comprising a light fixture provided within the housing.

23. The electrical appliance according to claim 1, wherein the modular component further comprises a heating element.

24. The electrical appliance according to claim 1, wherein the modular component further comprises an infrared device.

25. The electrical appliance according to claim 1, wherein the housing includes at least one channel provided along at least a portion of the open side portion of the housing, such that the end panel fits within the channel.

26. The electrical appliance according to claim 25, wherein the end panel is flat.

27. The electrical appliance according to claim 26, further comprising:
   an elongated slot provided in the channel along a wall; and
   a detent mechanism extending from a side of the end panel and elastically deformable, the detent mechanism adapted to engage with the slot and removably lock the end panel within the housing.

28. The electrical appliance according to claim 27, wherein a slot is provided in each channel of the two opposite side walls, and a corresponding detent mechanism is provided extending from opposite sides of the end panel, wherein the detent mechanisms extend into the slots for removably locking the end panel in the housing.

29. The electrical appliance according to claim 1, wherein the end panel includes an electrical compartment.

30. The electrical appliance according to claim 1, further comprising:
   at least one snap-fit mechanism provided on the modular component to removably locate the modular component within the housing, wherein the modular component is placeable in and removable from the housing without tools.

31. The electrical appliance according to claim 1, wherein the end panel includes a plug adapted to electrically connect with a connector on the modular component.

32. The electrical appliance according to claim 1, wherein a wiring assembly is provided on the end panel adapted to cooperate with electrical components of at least the modular component to allow the electrical components to be electrically powered.

33. The electrical appliance according to claim 1, wherein the end panel includes a exhaust outlet.

34. The electrical appliance according to claim 33, wherein the exhaust outlet includes a fan.

35. The electrical appliance according to claim 1, wherein the end panel fits within the housing such that the end panel may be replaced without expanding beyond the housing by moving the end panel perpendicular to a back wall of the housing.

36. The electrical appliance according to claim 1, wherein the housing is shaped as a box.

37. The electrical appliance according to claim 1, wherein the housing includes mounting poles for locating modular components of different heights within the housing.

38. The electrical appliance according to claim 37, wherein the mounting poles are provided adjacent an inside surface of housing walls.

39. The electrical appliance according to claim 37, wherein the modular component is secured to the mounting poles by a fastener inserted through a top of the mounting poles.

40. A snap-fit mechanism, comprising:
an elastically deformable member having two sides; and
a U-shaped extension, extending from at least one side of the member,
wherein the U-shaped extension is adapted to engage a hole to removably lock the snap-fit mechanism in place.

41. The snap-fit mechanism according to claim 40, wherein the U-shaped extension is adapted to fit within a hole of a housing to removably secure the snap-fit mechanism within the hole.

42. The snap-fit mechanism claim 41, wherein the generally U-shaped extension is adapted to fit a tab from the hole within the generally U-shaped extension to removably secure the snap-fit mechanism within the hole.

43. The snap-fit mechanism according to claim 40, wherein the elastically deformable member is generally U-shaped.

44. The snap-fit mechanism according to claim 43, wherein the generally U-shaped extension is provided perpendicular to the side of the elastically deformable generally U-shaped member.

45. An electrical appliance comprising:
a housing having an open side portion and an open front portion adjacent the open side portion;
a removable end panel provided within the open side portion and to substantially close the open side portion;
a modular component provided within the housing to establish the function of the electrical appliance; and
a wiring assembly provided on the end panel,
wherein the end panel is interchangeable such that the end panel provided within the open side of the housing includes the electrical compartment adapted to support electrical components of at least the modular component.

46. The electrical appliance according to claim 45, wherein the wiring assembly is adapted to cooperate with the electrical components of at least a heat lamp.

47. The electrical appliance to claim 45, wherein the wiring assembly is adapted to cooperate with the electrical components of at least a fan.

48. The electrical appliance according to claim 45, wherein the wiring assembly is adapted to cooperate with the electrical components of at least a heater.

49. The electrical appliance according to claim 45, wherein the wiring assembly is adapted to cooperate with the electrical components of at least a light fixture.

50. The electrical appliance according to claim 45, wherein the wiring assembly is adapted to cooperate with the electrical components of at least a motor.

51. The electrical appliance according to claim 45, wherein the wiring assembly is adapted to cooperate with the electrical components of at least an infrared device.

52. The electrical appliance according to claim 45, wherein the housing is shaped as a box.

53. The electrical appliance according to claim 45, wherein the wiring assembly includes a plug assembly adapted to electrically interconnect with wiring from the modular component.

54. The electrical appliance according to claim 45, wherein the wiring assembly includes a junction box within which electrical connections for modular components are made.

55. A method of constructing an electrical appliance, comprising the steps of:
providing a housing with an open side and an open front, adapted to receive a plurality of modular components;
selecting at least one modular component adapted to perform at least one of air conditioning, air moving, light emitting and infrared light emitting;
selecting an endwall adapted to cooperate with the at least one modular component so that the component operates as intended when installed in the housing; and
assembling the modular component in the housing and the endwall within the open side.

* * * * *